Figure 1:
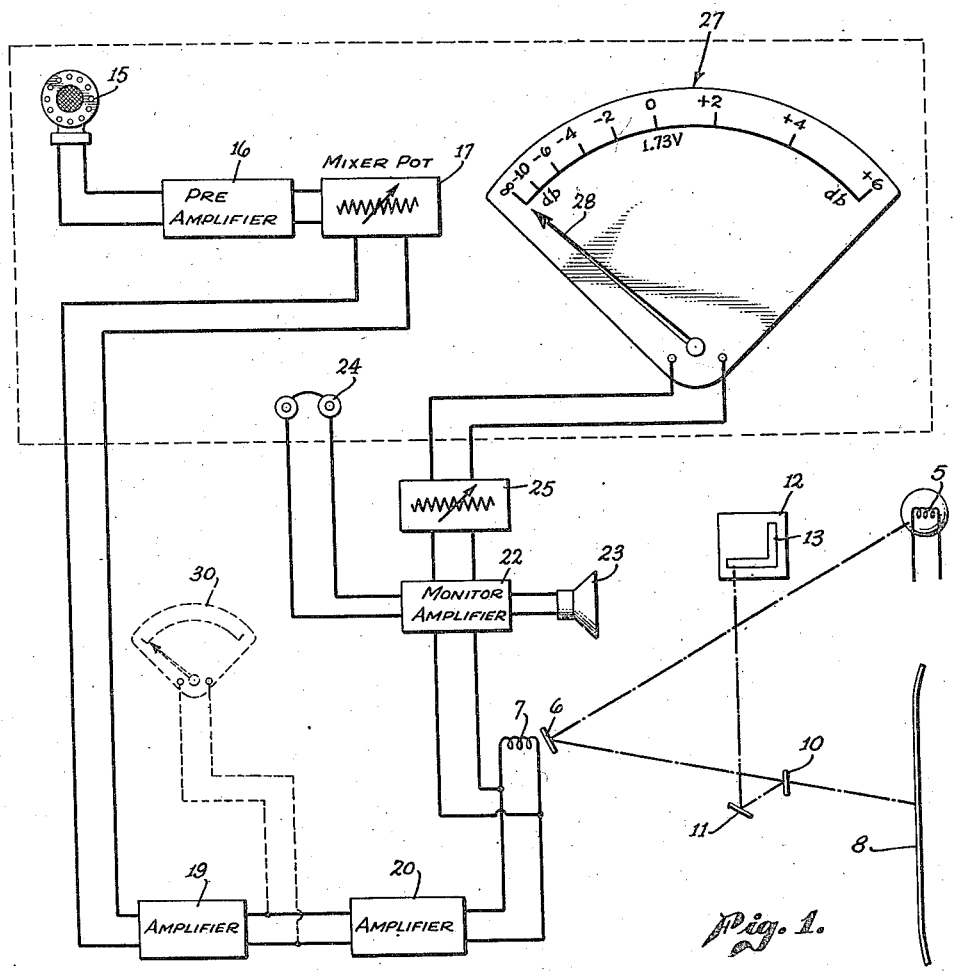

Feb. 15, 1944.    J. L. FIELDS    2,341,706

MONITORING SYSTEM FOR SOUND RECORDING

Filed May 31, 1940

Inventor
JAMES L. FIELDS,
By [signature]
Attorney

Patented Feb. 15, 1944

2,341,706

UNITED STATES PATENT OFFICE 2,341,706

MONITORING SYSTEM FOR SOUND RECORDING

James L. Fields, North Hollywood, Calif., assignor to Radio Corporation of America, a corporation of Delaware Application May 31, 1940, Serial No. 338,033

3 Claims. (Cl. 171—95)

This invention relates to sound recording systems and particularly to apparatus for monitoring the volume or level of sound being impressed upon a recording medium, such as a motion picture film.

In the production of sound motion pictures, the sound is usually recorded simultaneously with the photographing of the picture scene, the picture camera being located at the scene of action, and the sound recorder being located at a distant point. Of course, a portion of the sound recording apparatus is also located at the scene of action, this portion usually consisting of the pickup microphone, a pre-amplifier, a mixer "pot" or potentiometer, a volume indicator in the form of a meter for visually monitoring the signal level, and a set of headphones for audibly monitoring the signal. The remainder of the recording apparatus is located either at a distant recording building or in a mobile recording unit.

In setting up a recording system so that the respective gains of the various amplifiers between the microphone and recorder are properly adjusted with respect to the signal input level at the microphone and the final level at the recorder, it is necessary to make several tests at various points in the transmission circuit. It is also necessary that the monitoring elements, such as the headphones and meter, be adjusted with respect to the range of amplitudes being recorded and impressed upon the film. Adjustments of amplitude levels are observed on volume indicator meters of the swinging needle type employing rectifier units. It has been found, however, that the present type of volume indicator or VI meters, although satisfactory for steady current conditions, are difficult to read when the volume levels vary rapidly, such as in dramatic dialogue and music. The readability of such a VI meter is particularly important in the control of signal levels especially when the signal range exceeds that of the film range. The present invention provides a visual type of monitor meter which has been found to provide the mixing operator with an accurate indication of the actual light variations being impressed upon the film at all levels as well as a meter which is easily readable during rapid volume variations.

The principal object of the invention, therefore, is to facilitate the monitoring of a sound recording system.

Another object of the invention is to improve the readability of a volume indicator meter.

A further object of the invention is to provide a timing circuit for a volume indicator which provides a faster and more stable action for variations in volume impressed thereon.

Figure 2:
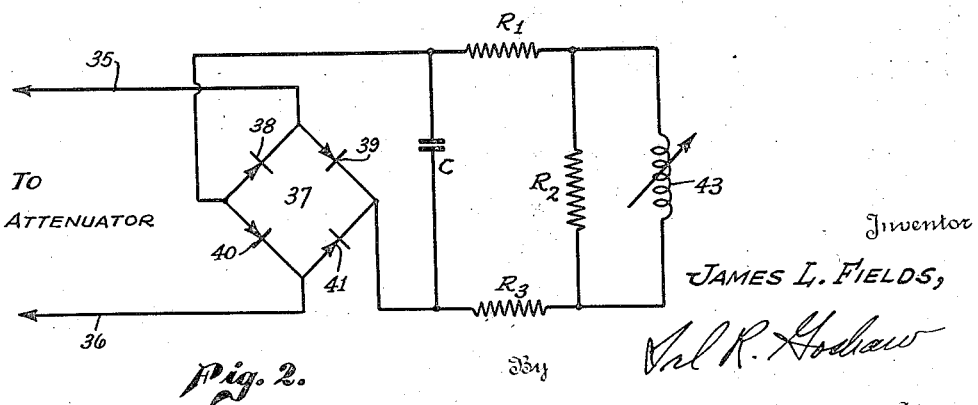

Although the novel features which are believed to be characteristic of this invention are pointed out with particularity in the claims appended herewith, the manner of its organization and the mode of its operation will be better understood by referring to the following description read in conjunction with the accompanying drawing forming a part thereof in which Fig. 1 is a diagrammatic drawing of the usual type of sound recording system emphasizing the monitoring elements embodying the invention; and Fig. 2 is a schematic drawing of the circuit for the volume indicator meter of Fig. 1.

Referring now to the drawing, the sound recorder is diagrammatically represented solely by a light source 5, a galvanometer mirror 6 with its actuating coil 7, and a film 8, the light monitoring portion thereof being shown simply by mirrors 10 and 11 and a monitor card 12 with its light image 13 for both the modulation and noise reduction variations in the light beam. The details of such a recorder are disclosed and claimed in copending application of C. N. Batsel, Serial No. 177,907, filed December 3, 1937, now Patent No. 2,220,198.

Located on the stage or at the scene of action is a microphone 15 with its pre-amplifier 16 feeding an attenuator or variable potentiometer 17 called a "mixer pot." The outputs of several microphones positioned around a set may be "mixed" at 17, only one being shown for the sake of clarity. The output of the mixer 17 is transmitted to an amplifier 19 and then to a second amplifier 20 which feeds the light modulating galvanometer coil 7. Bridged across the output of amplifier 20 is a monitor amplifier 22 which feeds a loudspeaker monitor 23 positioned at the recorder, a pair of headphones 24 located at the scene of action, and an attenuator 25, the output of the attenuator being connected to a volume indicator meter 27, also at the scene of action. For test purposes, there is shown in dotted lines, bridged across the output of amplifier 19, a volume indicator 30.

The above description includes the essential elements for recording sound on film normally employed in the production of sound pictures. That is, the elements 15, 16, 17, 24 and 27, shown within the block of dotted lines, are located on the stage or scene of action, while the remaining apparatus is located in a sound truck or a sound building at a distant point. Thus, although the recordist is able to initially adjust the signal strength and is aware of the amplitude thereof impressed on the film by his monitoring card 12, the mixer on the stage actually controls the volume level during recording. Thus, the mixer must have a volume indicator which is particularly adapted to provide an accurate and readable indication of the sound level variations regardless of their frequency and amplitude. The present type of meter now known does not provide the necessary accuracy and readability, particularly during volume level variations accompanying the recording of dramatic dialogue and music.

In setting up the apparatus, the volume indicator 30 is bridged across the output of amplifier 19 or input of amplifier 20. Then with a tone impressed on the microphone 15, the input to the amplifier 19 is adjusted so that the meter 30 reads zero level, which corresponds to 1.73 volts for a 500 ohm line. After this adjustment has been made, the amplifier 19 is then backed down in gain by 10 db. At this point, the meter 27 is adjusted by the variable attenuator 25 so that the meter 27 reads +4 db. This is the normal setup. After this adjustment is made, the recordist makes the necessary adjustments to his galvanometer mirror 6 and other recording elements.

Now, during recording, the mixer varies the input level to amplifier 19 by the mixer pot 17 and is guided by his observation of the needle 28 of meter 27. Although the headphones 24 give some indication of volume level, they are usually used to determine the quality of the signal and to provide a check on the visual meter particularly where reverberation enlivens the signal. It will be noted that in this type of operation it is necessary that the needle 28 of the meter 27 be particularly sensitive to, and actually indicate, peak values of short duration of the signal so as to avoid overshooting of the sound track, while at the same time it should not be so sensitive that it will follow all variations in volume of the signal. The meters now known in the art for this use are slow to respond to short, momentary impulses and are particularly insensitive at low volume levels and they follow the peaks and valleys of the volume variations so that the mixing operator is unable to adjust his volume levels with a high degree of accuracy even after long experience.

The present invention is directed to a circuit for the meter 27 to provide a needle action which will permit the mixer to improve his control of the variations in volume as impressed upon the film.

Referring now to Fig. 2, the open ends of conductors 35 and 36 are connected to the attenuator 25 or to the monitor 22, in case no attenuator is used. The other ends of conductors 35 and 36 are connected to a bridge type rectifier unit 37 composed of units 38, 39, 40 and 41. The direct current output from the rectifier unit 37 is connected to a moving coil 43 of the meter 27 in series with resistances $R_1$ and $R_3$. Shunted across the moving coil is a resistance $R_2$, and shunted across the output of the rectifier 37 is a capacitor C. The values of these elements are such as to provide a response which is particularly sensitive to voltage increases both large and small and which has a slow restoration period caused by the discharge of condenser C. One set of values for a meter having a moving coil with an impedance of 525 ohms at 1000 cycles is as follows: The value of $R_1$ is 3735 ohms; $R_2$, 1950 ohms; and $R_3$, 1250 ohms. For other coil impedances, different resistance values are necessary to provide the desired needle action. All these elements may be enclosed within the meter casing.

The needle 28 of meter 27 rapidly follows the voltage increases but has a slow decay period, this period being such that for dramatic variations in volume of the signal, the needle will not follow the valleys of the variations and will, therefore, provide a more steady action. This action provides greater readability of the meter at all volume levels and particularly for low volumes in the neighborhood of −10 db to −5 db, since the average position of the needle is above that of the average variation of the signal being recorded. These meters are calibrated in decibels, or db, which is a logarithmic scale, and the scale dimensions are smaller at the low volume levels, as shown in meter 27. It has been found in actual practice that the use of the above-described timing circuit has improved the quality of the recorded sound to a considerable extent, improvement being particularly noticeable in recordings of signal ranges considerably beyond the film range. This is due, no doubt, to the mixer's ability to control peak-clipping of the high momentary peaks, while maintaining the low volume levels above the lower film limit.

What I claim as my invention is:

1. A meter system for measuring current levels, said system comprising a moving coil, means connected to said coil for impressing current thereon, a rectifier, a resistance in series with said rectifier and moving coil, a resistance in shunt with said coil and a condenser in shunt with said rectifier, said coil having an impedance of substantially 525 ohms at 1000 cycles, said series resistance having a value of substantially 5000 ohms, said shunt resistance a value of substantially 2000 ohms, and said condenser a value of substantially 25 microfarads.

2. A meter system for measuring voltage levels, said system comprising a moving coil, means connected to said coil for impressing voltage variations thereon, a rectifier, a resistance in series with said rectifier and moving coil, a resistance in shunt with said coil, and a condenser in shunt with said rectifier, said series resistance being divided into two sections connected in each lead to said coil, one of said sections having a value of approximately 3750 ohms, and the other section having a value of approximately 1250 ohms.

3. A volume indicating meter comprising a moving coil, a needle adapted to be moved with movement of said coil, a scale over which said needle is adapted to move, a rectifier, and circuit timing means connected intermediate said rectifier and said coil, for providing said coil with a rapid response to voltage increases and a slow response to voltage decreases, said circuit timing means including a condenser of approximately 25 microfarads and a resistance of approximately 2000 ohms in shunt to said rectifier and said coil, and a resistance of approximately 5000 ohms in series with said rectifier and said coil, said coil having an impedance of approximately 525 ohms at 1000 cycles.

JAMES L. FIELDS.